INVENTOR.

LUDWIG SCHÜSSLER

United States Patent Office 3,557,601
Patented Jan. 26, 1971

3,557,601
CONTROL OF A FORGING MANIPULATOR COOPERATING WITH A FORGING PRESS
Ludwig Schüssler, Willich, Germany, assignor to Schloemann Aktiengesellschaft, Dusseldorf, Germany, a corporation of Germany
Filed Apr. 16, 1968, Ser. No. 721,824
Claims priority, application Germany, Apr. 22, 1967, Sch 40,595
Int. Cl. B21j *15/24*
U.S. Cl. 72—420                      3 Claims

ABSTRACT OF THE DISCLOSURE

Means for controlling a forging manipulator cooperating with a forging press, comprising: a manipulator carriage with driving wheels running upon rails towards and away from the forging press, a tongs-holder and tongs axially and rotationally movable, a hydro-motor for driving the driving wheels of the manipulator carriage, a piston-and-cylinder unit actuated by fluid pressure for moving the tongs-holder axially at the same speed as the manipulator carriage either in the same direction or in the opposite direction, two adjustable means, such as hydro-pumps or quantity-regulating valves, a servo-control for continuously adjusting the two said adjustable means, and rodding through which the servo-control acts upon the said hydro-pumps or valves.

---

Figure 1:
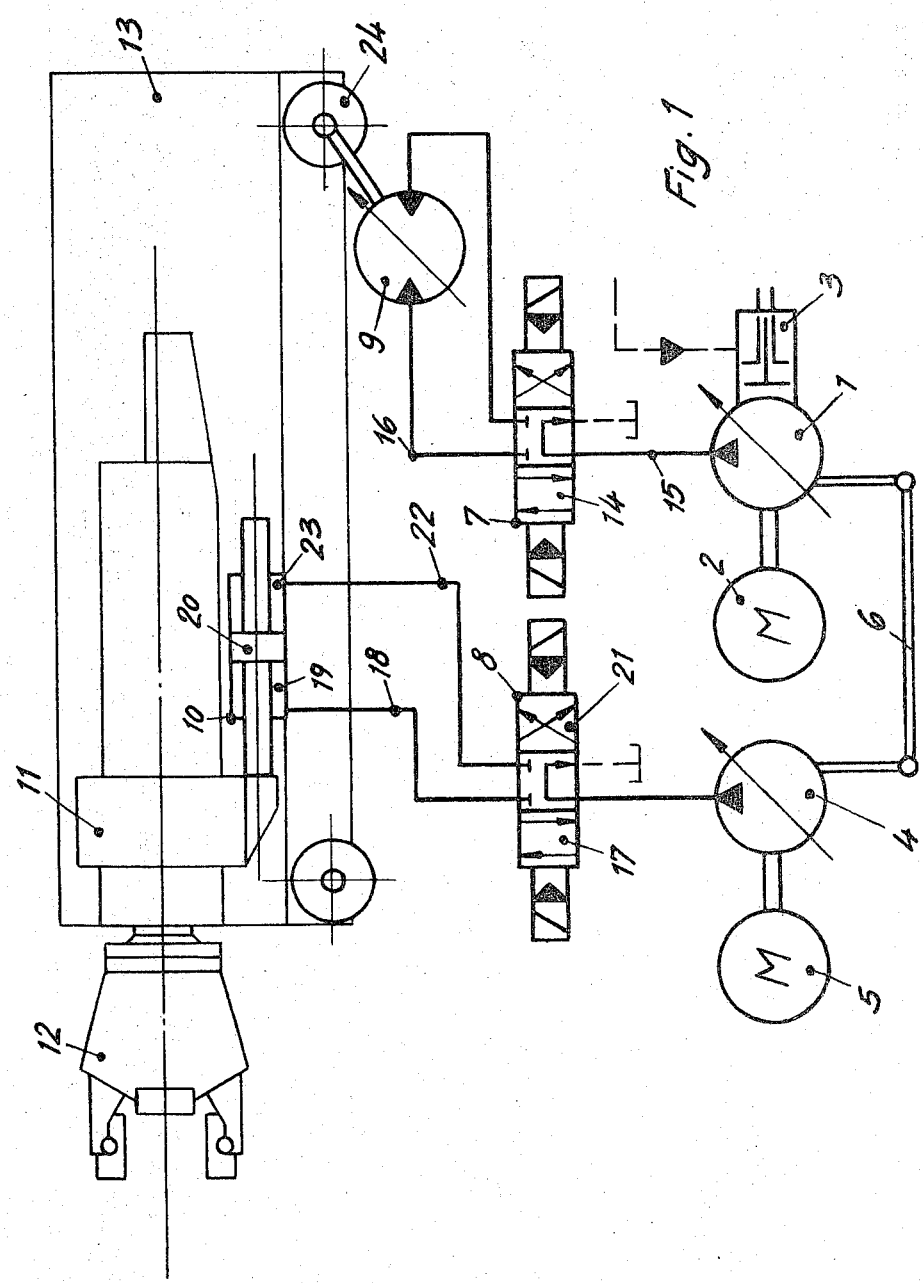

This invention relates to means for controlling a forging manipulator cooperating with a forging press, and comprising a manipulator carriage running on rails, with tongs (or jaws), and a tongs-holder (or peel assembly), axially and rotationally movable, arranged upon the carriage, the wheels of the carriage being driven by means of a hydro-motor, and the axial movement of the tongs-holder, with the tongs, being effected by means of a piston-and-cylinder unit actuated by fluid under pressure.

In consequence of the increasing sizes and weights of the forgings that are to be grasped and lifted, rotated, or axially displaced with the tongs arranged upon a manipulator carriage, the weight of the manipulator as a whole is also increased. When beating out a forging, for instance, the workpiece sometimes has to be moved through a difinite distance axially towards or away from the forging press. For this purpose the entire mass of the manipulator has had to be accelerated or retarded. This involved an incomparably large expenditure of energy, and, above all, of time, in order to carry out these movements stepwise. In addition to this, it was not possible, or was only possible with difficulty, to maintain with exactitude the paths to be provided.

One has therefore felt constrained to allow the manipulator carriage to run on in a known manner, during the forging operation, in which case the workpiece lay upon the lower forging saddle and was held fast by the upper saddle. Under these circumstances the pressure liquid from the cylinder effecting the displacement of the tongs-holder upon the carriage was expelled, into a hydro-storage, in consequence of the tongs standing fast relatively to the press, while the carriage was continuing to travel.

With other processes there have been provided, instead of a cylinder and a storage vessel, a spring arranged between the tongs-holder and the carriage. This spring was compressed during the forging operation, whilst the tongs-holder remained stationary relatively to the press and the undercarriage continued travelling. Upon the upper saddle being raised, with accompanying release of the forging, the spring gave back its potential energy, in the form of kinetic energy, to the tongs-holder and the workpiece, whereby the tongs-holder was again displaced relatively to the carriage. A precise mounting of the workpiece upon the saddle was however impossible. As a special disadvantage with these two arrangements there was found to be excessive wear of the forging saddles owing to the axial pull and/or thrust of the workpiece transverse to the saddles.

With another known arrangement of a manipulator carriage travelling continuously during the forging operation, the tongs-holder, with the tongs and the workpiece, does indeed also move with the same speed as the manipulator carriage but in the opposite direction, that is to say, the tongs-holder remains stationary relatively to the press.

This relative speed, however, is not controlled, but occurs owing to the fact that in consequence of the workpiece being held fast between the forging saddles, pressure liquid is forced out of the cylinder-and-piston displacement unit, from one side of the piston, through a controlled valve, to the other side of the piston. By an electrical impulse from the forging press, transmitted upon liberation of the forging, a reversal is then effected, whereby the tongs-holder is now moved through a definite distance in the direction of movement of the carriage. Here again the forging saddles, owing to the holding fast of the tongs-holder, are more strongly stressed upon the moving manipulator carriage.

It has therefore been proposed, on the ground of the increasing working speeds of high-speed forging presses, also to control the relative movement of the tongs-holder upon the continuously travelling manipulator carriage, for the purpose of the stand-still relative to the forging press, by way of a drive. In this case a pump supplying fluid under pressure for the displacement movement of the tongs-holder upon the manipulator carriage was connected positively with the drive for the travel of the manipulator carriage. By this means, even with different continuous speeds of the carriage, the tongs-holder speed attained always has to be equal in magnitude but opposite in direction, the tongs-holder then being stationary relatively to the forging press.

A certain disadvantage however resides in the fact that this pump, on account of the positive coupling with the travel drive, can only be regulated by changing the speed of travel. In consequence of the poor volumetric efficiency in the lower range of speeds of pumps, the delivery of the pump would not vary proportionally with the speed of the carriage.

The present invention is based upon an equivalent problem of providing driving possibilities, adjustable to one another, on the one hand for the travelling drive of the carriage and on the other hand for the axial drive of the tongs-holder, so that the carriage can travel with continuous speed towards and away from the forging press, and so that the tongs-holder, during the rhythm of the forging strokes, can travel with a speed equal in magnitude but opposite in direction to the movement of the carriage, and, upon liberation of the forging by the forging press, is controllable when driven with speed in the same direction as the carriage.

This is attained according to the invention by the feature that for the continuous travelling movement of the carriage, and the movement of the tongs-holder relative to the carriage, two adjustable means are provided, traversed by pressure fluid and coupled to one another, which yield characteristic curves proportional to one another. In this case, as the means traversed by the pressure fluid, there are provided, on the one hand, two hydro-pumps driven independently of one another, the two pumps being continuously adjustable by a servo-control by way of an adjusting drive common to both, constructed as a rod mechanism. On the other hand, as means traversed by the pressure fluid, two quantity-regulating valves, with a pressure-fluid storage means preceding them both, are provided, the quantity-regulating valves being continuously adjustable by a servo-control, by way of sliding links or wedges adjustable upon a common rod mechanism.

The advantage of this method of control therefore resides in the fact that on the one hand pumps driven independently of one another, and exhibiting proportional characteristic curves in every range of speeds, are at the same time continuously adjustable by only one servo-control by means of a common adjusting drive. In this case it is always ensured that even without a positive drive of the tongs-holder-displacement pump by the travel drive of the carriage, in every range of speeds, a speed for the tongs-holder is yielded, which is equal in magnitude but opposite in direction to the carriage-travel movement, during the particular forging rhythm. Thus the tongs remain stationary relatively to the forging press during this time. Furthermore, in consequence of the controlled drive of the tongs-holder upon the carriage, the forging saddles are now no longer stressed by frictional forces.

After the closure of this partial forging operation, there is now imparted to the tongs, with the tongs-holder, by way of their displacement cylinder, by reversal of the flow of pressure fluid to the other side of the piston, an acceleration with equally great speed, and this time in the same direction of travel as the carriage, until the next forging-out breadth provided lies above the forging saddle.

The two quantity-regulating valves provided, on the other hand, instead of two pumps, which may exhibit different sizes and delivery quantities according to the size of cylinder of the tongs-holder and to the absorption capacity of the hydro travelling motor, with characteristics proportional to one another and with preceding hydro-storage means, likewise ensure, with different, selectable but continuous speeds of travel, a correspondingly equal tongs-holder speed in either the same or opposite directions. Here again, in a simple manner, the regulating of the various speeds is effected by a single servo-control by way of adjustable sliding links arranged upon a rod mechanism.

In consequence of the continuous movement of the large mass of the manipulator carriage, and of the driving movement of the tongs-holder, controlled both during the forging operation and during the release of the forging, with its substantially smaller mass as compared with the under carriage, it is now possible to carry out the individual forging-press operations in a substantially shorter time, and therefore more economically, and without wearing out the forging saddles.

Figure 2:
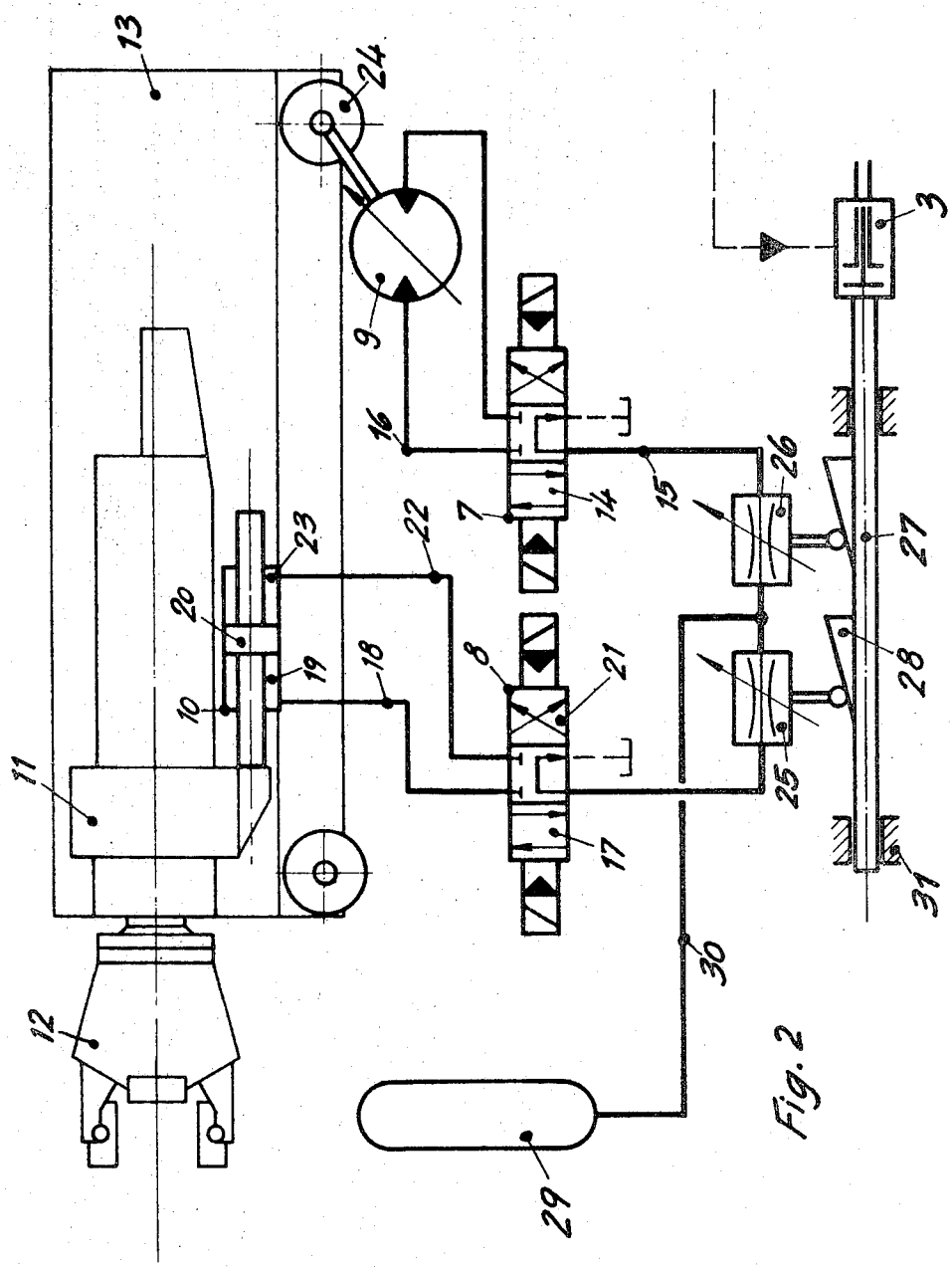

The invention is described hereunder with reference to the accompanying diagrammatic drawings, in which:

FIG. 1 is a side view of a manipulator carriage, with the motors, pumps, valves, storages and pipes indicated by symbols, the supply of oil under pressure being effected in this figure by way of pumps; and FIG. 2 is a similar view of an embodiment in which oil is supplied by hydro-storage by way of quantity-regulating valves.

The pump 1 in FIG. 1, for instance an axial-piston pump, is driven by a motor 2, and its delivery is varied continuously, from zero to a maximum, by means of a servo-control 3. A pump 4, driven by a motor 5, is coupled by way of rodding 6 with the pump 1, and consequently ranges, likewise continuously, from zero to maximum delivery flow. By way of a 4/3-way valve 7 the pressure oil from the pump 1 passes to a hydro-motor 9, which moves a manipulator carriage 13 continuously to and fro. The pressure oil from the pump 4 passes by way of a 4/3-way valve 8 to a cylinder 10, and actuates a piston 20, which moves a tongs-holder or peel assembly 11, with tongs or jaws 12, likewise continuously to and fro. The cylinder 10 is connected fast with the manipulator carriage 13.

Quantity-regulating valves 25 and 26, in FIG. 2, are in communication with hydro-storage means 29 by way of a pipe 30, the pressure oil passing to the hydro-motor 9 and to the cylinder 10 in the same way as in the case of the pumps in FIG. 1. The controlling of the quantity-regulating valves 25 and 26 is effected by way of a sliding-link rod 27, axially guided in bearings 31, with adjustable sliding links or wedges 28, the rod 27 being at the same time controlled continuously from zero to maximum delivery flow, likewise by way of a servo-control 3.

Since, with forward and reverse running of the manipulator carriage 13, with the tongs-holder 11, only the 4/3-way valves 7 and 8 each time are controlled, only the operation of the forward run of the manipulator carriage 13, with simultaneous return of the tongs-holder 11, will now be described in detail.

In FIG. 1, the pump 1 is adjusted by means of the servo-control 3, an electrical impulse being at the same time transmitted to the 4/3-way valve 7, and the part 14 of the valve coming into operation. The pressure oil passes from the pump 1 through a pipe 15, the valve 7 and a pipe 16 to the hydro-motor 9, which sets the manipulator carriage 13 in forward motion. With the adjusting of the pump 1, there is at the same time also effected the transmission of an electrical impulse to the valve 8, whereupon the position 17 of the valve 8 comes into operation. Pressure oil from the pump 4 now passes through the valve 8 and through a pipe 18 into a cylinder space 19 in the cylinder 10, and pushes back the piston 20, with the tongs-holder 11 secured thereto, and the tongs 12, towards the right. The absorption volumes of the cylinder space 19 and of the hydro-motor 9 are adjusted to the delivery flows of the pumps 1 and 4, in such a way that the speed of advance of the carriage is just as great as the speed of return of the tongs. The tongs 12 consequently remain stationary in space.

The function of the pumps 1 and 4 is in FIG. 2 taken over by the hydro-storage means 29 and the quantity-regulating valves 25 and 26, the quantity-regulating valves being so adjusted to one another as to fulfill the conditions of FIG. 1, and being continuously regulated by a servo-control 3, by means of adjustable sliding guides 28. The sliding guides are here arranged upon an axially displaceable rod 27 guided in bearings 31. The further procedure of the operation is effected exactly as described for FIG. 1.

The speeds of carriage advance and of tongs withdrawal are continuously variable by means of the servo-control 3 and the adjusting rodding 6 or 27.

For the advance of the tongs-holder 11, with the tongs 12, upon the advancing manipulator carriage 13, the valve 8 is thrown over to the position 21. As a result of this, the pressure oil from the pump 4 or from the quantity-regulating valve 25 passes by way of the pipe 22 into the cylinder space 23, and pushes the piston 20 back towards the left, into its initial position, with a speed equal to that of the carriage 13, the tongs-holder 11 of the tongs 12 being moved upon the manipulator carriage 13 in the direction of travel thereof. The tongs 12 consequently advances in space with twice the speed of the carriage.

I claim:

1. For cooperation with a forging press, a forging manipulator, comprising:
   a manipulator carriage having driving wheels running upon rails towards and away from the forging press,
   a peel assembly, with rotatable jaws for holding a workpiece, so mounted on the manipulator carriage as to be longitudinally displaceable relatively thereto,
   a hydraulic motor for actuating the driving wheels of the manipulator carriage,
   a hydraulic piston-and-cylinder unit for imparting axial movement to the peel assembly relatively to the manipulator carriage, means for controlling the movements of the peel assembly, relative to the manipulator carriage, during a forging stroke, at a speed equal in magnitude to that of the carriage but opposite in direction, means for controlling the movements of the peel assembly, upon release of the forging press, at a speed, relative to the carriage, equal to the speed of the carriage and in the same direction, two hydraulic pumps, driven independently of one another, one for the hydraulic motor and the other for the hydraulic piston-and-cylinder unit, these two pumps having approximately the same or proportional operating characteristics, and being continuously adjustable jointly with one another, and a single servo-control for mechanically coupling the two said pumps together.

2. For cooperation with a forging press, a forging manipulator, comprising:

a manipulator carriage having driving wheels running upon rails towards and away from the forging press, a peel assembly, with rotatable jaws for holding a workpiece, so mounted on the manipulator carriage as to be longitudinally displaceable relatively thereto, a hydraulic motor for actuating the driving wheels of the manipulator carriage, a hydraulic piston-and-cylinder unit for imparting axial movement to the peel assembly relatively to the manipulator carriage, means for controlling the movements of the peel assembly, relative to the manipulator carriage, during a forging stroke, at a speed equal in magnitude to that of the carriage but opposite in direction, means for controlling the movements of the peel assembly, upon release of the forging press, at a speed, relative to the carriage, equal to the speed of the carriage and in the same direction, two controllable quantity-regulating valves, one for the hydraulic motor and the other for the piston-and-cylinder unit, two hydraulic storage means, one preceding the hydraulic motor and the other preceding the piston-and-cylinder unit, adjustable wedges mounted upon a sliding link rod for continuously regulating the said valves jointly with one another, and a single servo-control for continuously adjusting the said sliding rod and wedges.

3. A forging manipulator as claimed in claim 1, further comprising a linkage mechanically coupling the two hydraulic pumps together, and thereby influencing the output delivery of the pumps.

References Cited

UNITED STATES PATENTS

| 3,274,819 | 9/1966 | Knowles | 72—421 |
| 3,468,154 | 9/1969 | Hertl | 72—421 |
| 3,267,708 | 8/1966 | Sims | 72—421 |
| 3,349,601 | 10/1967 | Burrows | 72—420 |

FOREIGN PATENTS 1,4451,178   5/1966   France.

CHARLES W. LANHAM, Primary Examiner

M. J. KEENAN, Assistant Examiner

72—422